(12) United States Patent
Goeden et al.

(10) Patent No.: US 7,810,251 B1
(45) Date of Patent: Oct. 12, 2010

(54) MOTORIZED LEVELING STAGES

(75) Inventors: Richard M. Goeden, Goleta, CA (US); Robert W. Dennis, Santa Barbara, CA (US); Ronald W. Berry, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 93 days.

(21) Appl. No.: 12/277,522

(22) Filed: Nov. 25, 2008

(51) Int. Cl.
*G01B 3/30* (2006.01)

(52) U.S. Cl. .......................... 33/567.1; 33/568; 33/537; 33/573; 269/9

(58) Field of Classification Search .................... 33/567, 33/567.1, 568, 573, 534, 536, 537; 269/9, 269/59
See application file for complete search history.

(56) References Cited

U.S. PATENT DOCUMENTS 3,499,642 A * 3/1970 Porter .......................... 269/71
3,820,247 A * 6/1974 Casey et al. .................... 33/537
4,398,349 A * 8/1983 Bailey ........................... 33/537
5,253,429 A * 10/1993 Konno et al. ................... 33/568
5,653,038 A * 8/1997 Hunter .......................... 33/573
5,731,641 A * 3/1998 Botos et al. .............. 310/12.06
5,836,080 A * 11/1998 Inagaki et al. ................. 33/1 M

* cited by examiner

*Primary Examiner*—Amy Cohen Johnson
(74) *Attorney, Agent, or Firm*—Haynes and Boone, LLP

(57) ABSTRACT

A motorized leveling stage capable of adjusting the angular position of a work piece relative to a reference plane includes an upper stage, a lower stage, and a hinge coupling corresponding edges of the two stages together for relative pivotal movement of the stages. A first spring pivotally biases the upper and lower stages toward each other about the axis of the hinge. A slide is disposed for sliding movement on an upper surface of the lower stage in a direction generally perpendicular to the hinge axis. The slide includes an upper surface defining an inclined plane disposed in sliding abutment with a lower surface of the upper stage such that movement of the slide toward and away from the hinge respectively raises and lowers the upper stage relative to the lower stage. A motorized drive assembly is operable to control movement of the slide relative to the hinge.

20 Claims, 9 Drawing Sheets

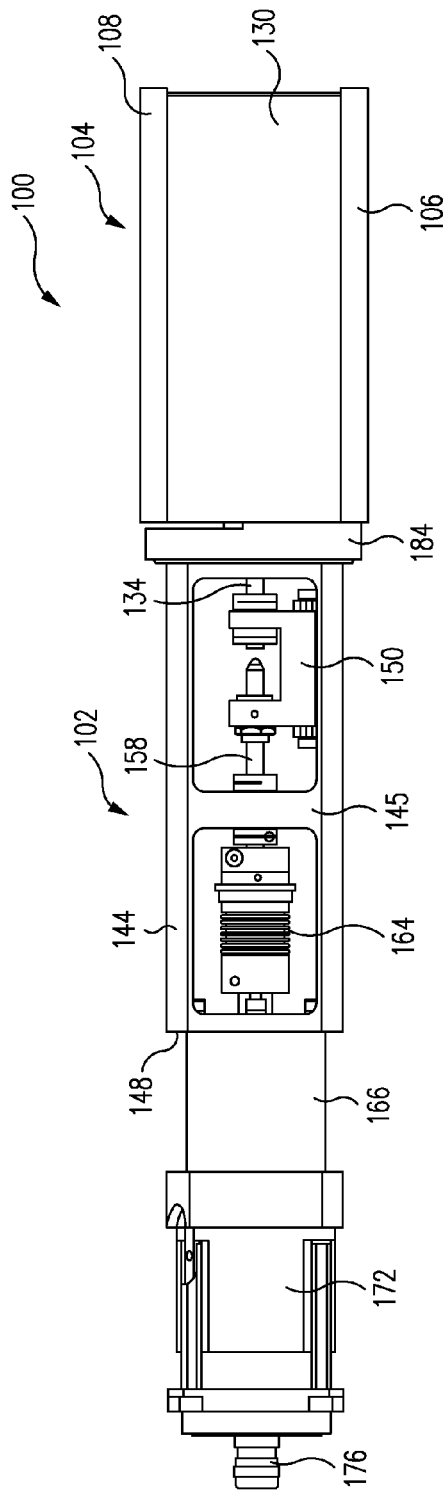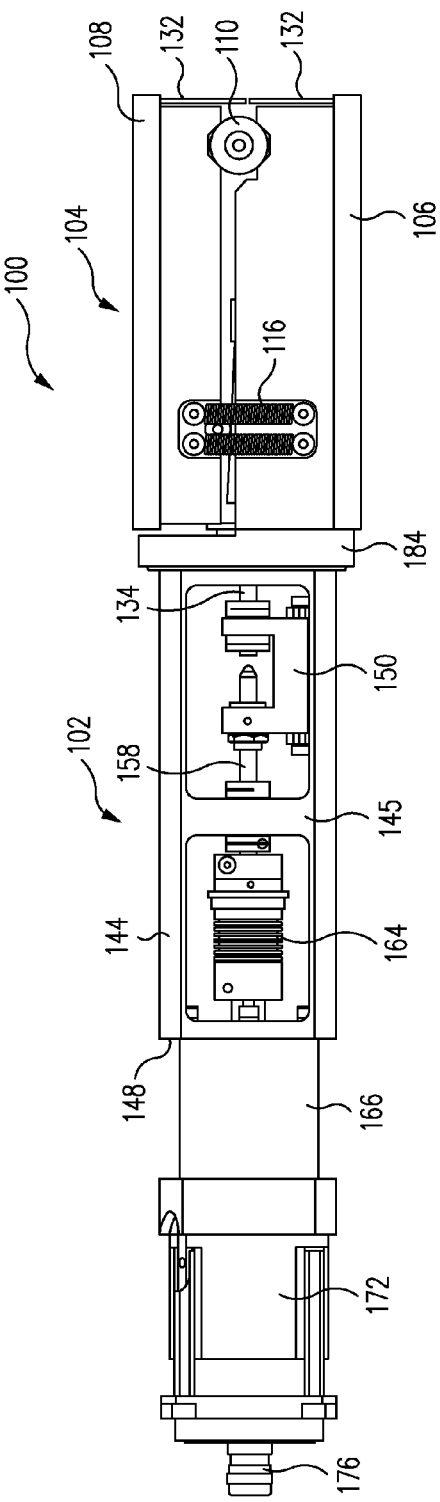

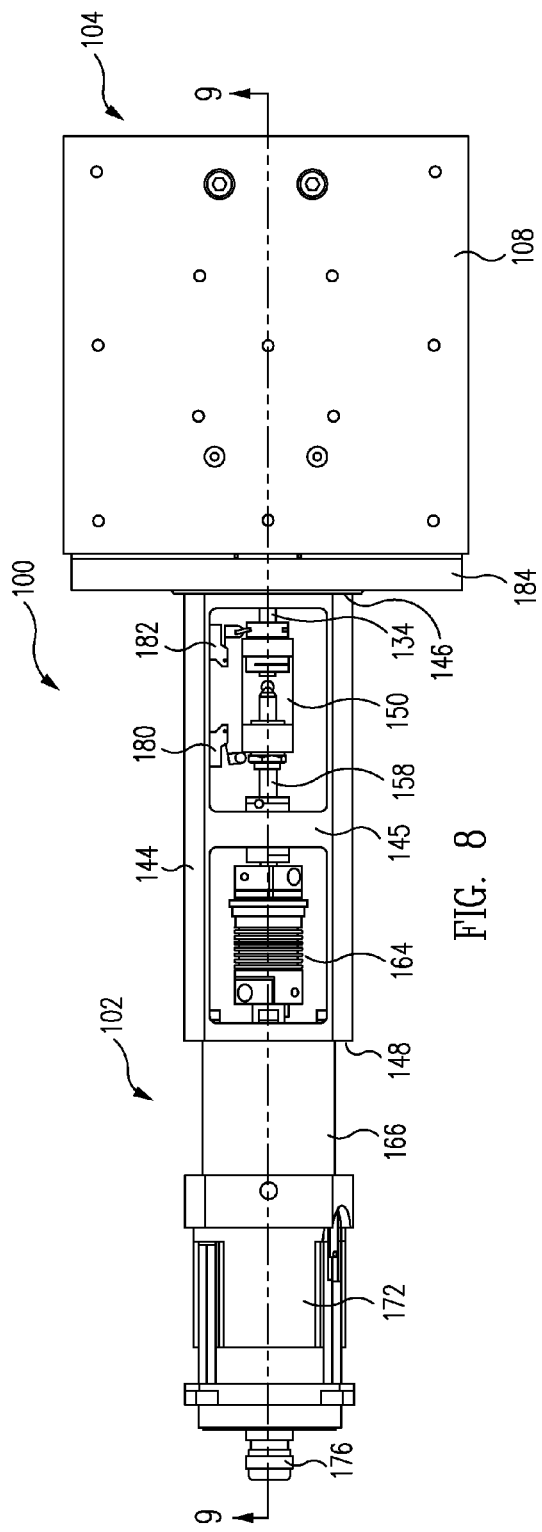
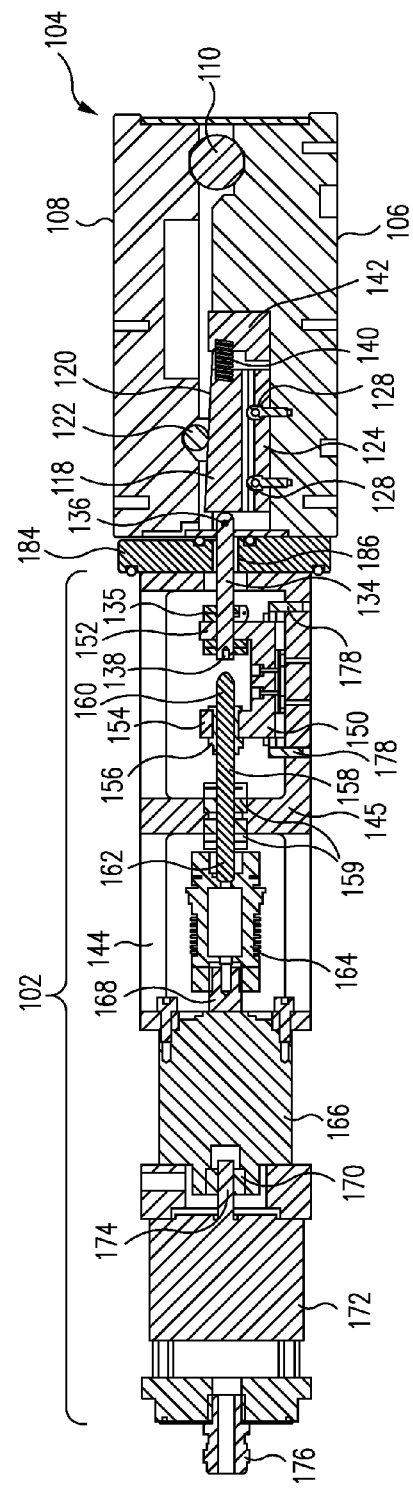
FIG. 8
FIG. 9

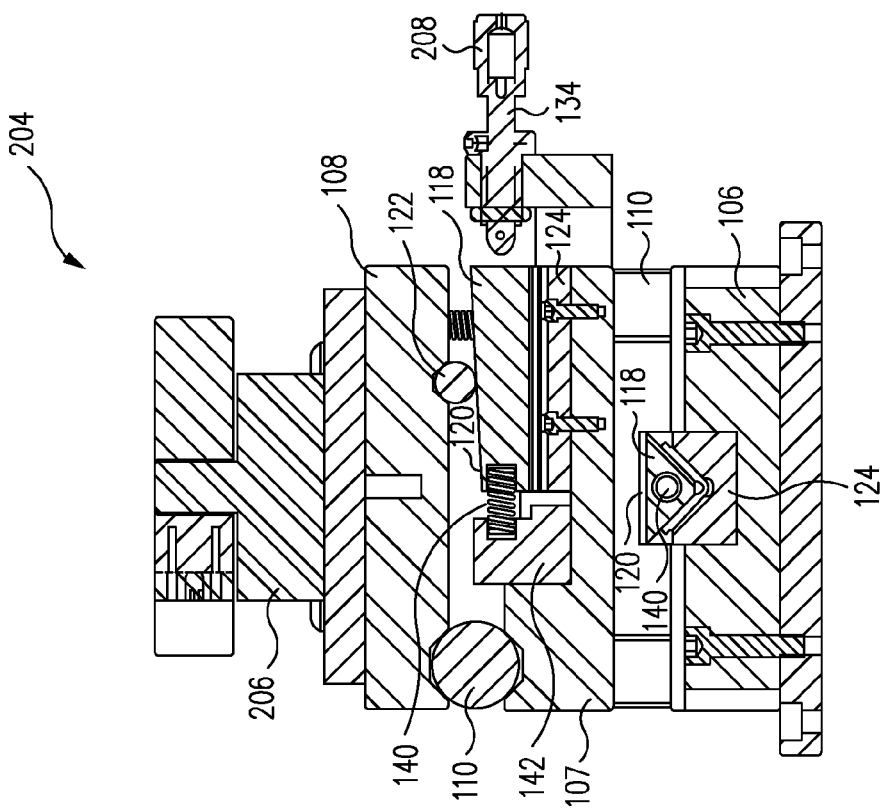

ized control.

MOTORIZED LEVELING STAGES

BACKGROUND

1. Technical Field

This invention relates to high precision manufacturing tools in general, and in particular for example, to motor driven leveling stages that are capable of adjusting the angular position of a work piece relative to a reference plane or surface with micro-arc-second precision.

2. Related Art

Many manufacturing processes entail the positioning of a work piece at a precise angle relative to a reference plane defined by, e.g., a surface plate or a cutting tool. For example, in the fabrication of certain types of semiconductor packages, it is necessary to machine semiconductor wafers or to electrically interconnect a semiconductor die with another die or an interconnective substrate, e.g., by means of cold-fused bumps of solder or a conductive adhesive. To effect these processes reliably, it is necessary to align the components precisely relative to the cutting tool or each other before the cuts or interconnects are made.

In the conventional machining of parts, skilled machinists sometimes use an apparatus referred to as a "sine bar" or "sine plate" to position a work piece at a selected angle on a bed or work surface of, e.g., a milling or grinding machine, and relative to a cutting or grinding head so as to produce a milled surface on the work piece that is disposed at a precise angle relative to the work surface. With reference to FIG. 15, a conventional sine plate 10 comprises a pair of flat lower and upper plates 12 and 14 that are hinged to each other at one end by a hinge or pivoting mechanism, such as a first cylindrical roller 16, so as to enable the opposite ends of the two plates 12 and 14 to open and close relative to each other like a clam shell. A second roller 18 may be disposed between the two ends of the plates opposite the first roller at a distance Y therefrom. The lower plate 12 is disposed on a reference surface, e.g., the upper surface of a surface plate 20 or the bed of a milling or grinding machine, and a work piece 22, shown by a dashed line outline in FIG. 15, is disposed on the upper plate 14. The size of the angle θ subtended between the upper and lower plates 12 and 14 is adjusted by inserting one or more shims or gage blocks 24 having a total thickness of X between second roller 18 and the upper surface of the lower plate 12, and is given by $\theta = \sin^{-1} X/Y$.

Although the conventional sine plate 10 of FIG. 15 is capable of being used to adjust the angle of a work piece 22 relative to surface plate 20 with some accuracy, it requires some manual skills on the part of the worker, is relatively cumbersome and time-consuming to set up and use, and is incapable of micro-arc-second precision. Additionally, because the apparatus lacks a protective enclosure, its use in an environment in which caustic fluids or vapors are present, such as in a semiconductor fabrication facility, is contraindicated.

Accordingly, a need exists for a motorized leveling stage that is protected from any hazardous elements in the work environment, such as caustic fluids, and that can be set up easily and then controlled from a remote location to adjust the angle of a work piece relative to a reference plane with micro arc-second precision.

SUMMARY

In accordance with one or more embodiments, motorized leveling stages are provided that are sealed against hazardous environmental elements in a work area in which they are used and that are capable of adjusting the angle of a work piece relative to a reference plane with micro-arc-second precision from a remote location either manually or under automatic, i.e., computerized, control.

In one embodiment, a motorized leveling stage comprises a stage having an upper stage, a lower stage, and a hinge coupling corresponding edges of the upper and lower stages together for pivotal movement of the two stages relative to each other about a pivot axis of the hinge. A first spring pivotally biases the upper and lower stages toward each other about the hinge axis. A slide is disposed for sliding movement on an upper surface of the lower stage in a direction perpendicular to the hinge axis. The slide has an upper surface defining an inclined plane disposed in sliding abutment with a lower surface of the upper stage such that movement of the slide toward and away from the hinge respectively raises and lowers the upper stage pivotally relative to the lower stage. A remotely controllable drive assembly is coupled to the stage and is operable to controllably move the slide relative to the hinge, and thereby raise and lower the upper stage relative to the lower stage in precise, controlled angular increments.

The scope of the invention is defined by the claims, which are incorporated into this section by reference. A better understanding of the above and many other features and advantages of the high precision motorized leveling stages of the invention may be obtained from a consideration of the detailed description of some example embodiments thereof below, particularly if such consideration is made in conjunction with the appended drawings, wherein like reference numerals are used to identify like elements illustrated in one or more of the figures thereof.

BRIEF DESCRIPTION OF THE DRAWINGS

FIG. 6 is a side elevation view of the leveling stage assembly of FIG. 1.

FIG. 7 is another side elevation view of the leveling stage of FIG. 1, in which a protective cover around the sides and rear of a stage portion of the leveling stage is removed to reveal the underlying structure thereof.

FIG. 8 is a top plan view of the leveling stage of FIG. 1.

FIG. 9 is a cross-sectional view of the leveling stage of FIG. 8, as seen along the lines of the section 9-9 taken therein.

FIG. 13 is a cross-sectional view of the dual axis leveling stage of FIG. 12, as seen along the lines of the section 13-13 taken therein.

FIG. 14 is a cross-sectional view of the dual axis leveling stage of FIG. 13, as seen along the lines of the section 14-14 taken therein.

DETAILED DESCRIPTION

Figure 1:
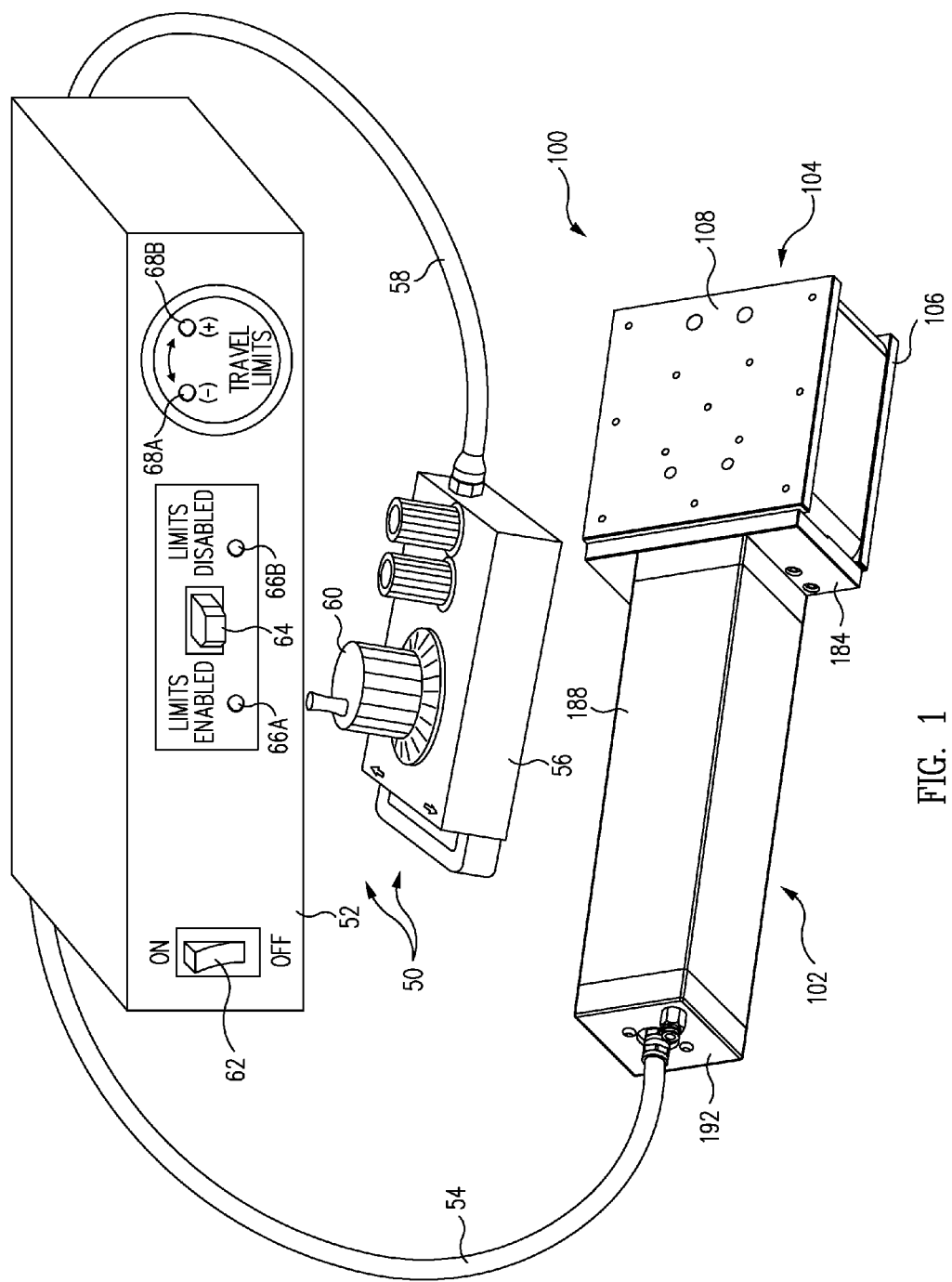
FIG. 1 is an upper front perspective view of a motorized leveling stage and controller therefor in accordance with an embodiment of the invention.

FIG. 1 is an upper front perspective view of an embodiment of a system comprising a leveling stage 100, which is motorized, and a motor controller 50 therefor in accordance with the invention. In the particular embodiment illustrated, the motor controller 50 includes a control unit 52 (e.g., for a stepper motor) that couples to the leveling stage 100 by means of a first wiring cable 54 extending from a rear surface of the control unit 52, and a manual input control "pendant" 56 that couples to the rear surface of the control unit 52 via a second wiring cable 58.

As illustrated in FIGS. 1-10, the leveling stage 100 comprises two main portions, viz., a stage drive 102 coupled to a stage 104. The stage 104, in turn, comprises a lower stage 106 that is adapted to be disposed on a reference plate or bed (not illustrated), and, as discussed in more detail below, an upper stage 108 that is arranged to pivot about an edge thereof to a selected angle relative to the lower stage 106 with micro-arc-second precision.

In use, an operator of the leveling stage 100 "dials in" a desired angular position of the upper, moving stage 108 of the stage 104 relative to the lower stage 106 thereof by means of, for example, a manually rotated stage angle input knob 60 located on the manual input control pendant 56, and this setting is conveyed by the second wiring cable 58 to the control unit 52. The control unit 52 includes circuitry, including a motor controller and amplifier (not illustrated), that converts the angle setting signal from the manual input control pendant 56 into a corresponding electrical signal that is output via the first wiring cable 54 to a motor 172 (see, e.g., FIG. 3) disposed in the stage drive 102, which converts the signal to a corresponding angular position of the upper stage 108 of the stage 104 relative to the lower stage 106 thereof in the manner described in greater detail below.

Although the particular example leveling stage 100 illustrated in FIG. 1 contemplates the use of a manual input control pendant 56, it is also possible to couple a computer, such as a personal computer, or PC (not illustrated), e.g., a laptop PC, to the control unit 52 via a suitable interface, such as a serial interface, and to then control the operation of the leveling stage 100 with the computer.

As illustrated in FIG. 1, the front panel of the example control unit 52 includes a manually actuated system power on-off switch 62 and a momentary contact switch 64 for temporarily overriding a limiting circuit of the system that limits the maximum and minimum relative angles between which the upper stage 108 of the stage 104 can travel. The angular limiting circuit also includes a pair of indicator lights 66A and 66B, e.g., light emitting diodes (LEDs), which indicate whether the limiting circuit of the control unit 52 is active or inactive. The motor drive limiting circuit includes a pair of limit switches 180 and 182 (FIG. 8) located in the stage drive 102 that are respectively tripped when the relative angular position of the upper stage 108 of the stage 104 exceeds either the maximum or the minimum angular positions allowed to prevent potential damage to the components of the stage drive 102. When either switch is tripped, electrical power is immediately disconnected from the motor 172 (e.g., a drive motor, such as a stepper motor). To move the upper stage 108 of the leveling stage 100 away from the maximum or minimum position at which it is located, the operator of the leveling stage 100 must hold the momentary contact switch 64 closed to restore power to the motor 172. The front panel of the control unit 52 also includes a pair of indicator lights 68A and 68B, e.g., LEDs, which respectively light when the upper stage 108 of the stage 104 is disposed in either the minimum or maximum allowable angular positions thereof.

As those of skill in the art will appreciate, whether the motorized leveling stage 100 is controlled by the manual input control pendant 56 or by a computer, by coupling the control unit 52 to the leveling stage via an elongated first wiring cable 54, the leveling stage 100, if suitably sealed, can then be located in a relatively hostile environment, e.g., the cutting area of a CNC milling machine or a semiconductor wafer fabrication chamber and fully controlled by an operator and control unit 52 located in a more benign environment that is remote from the work area.

Figure 2:
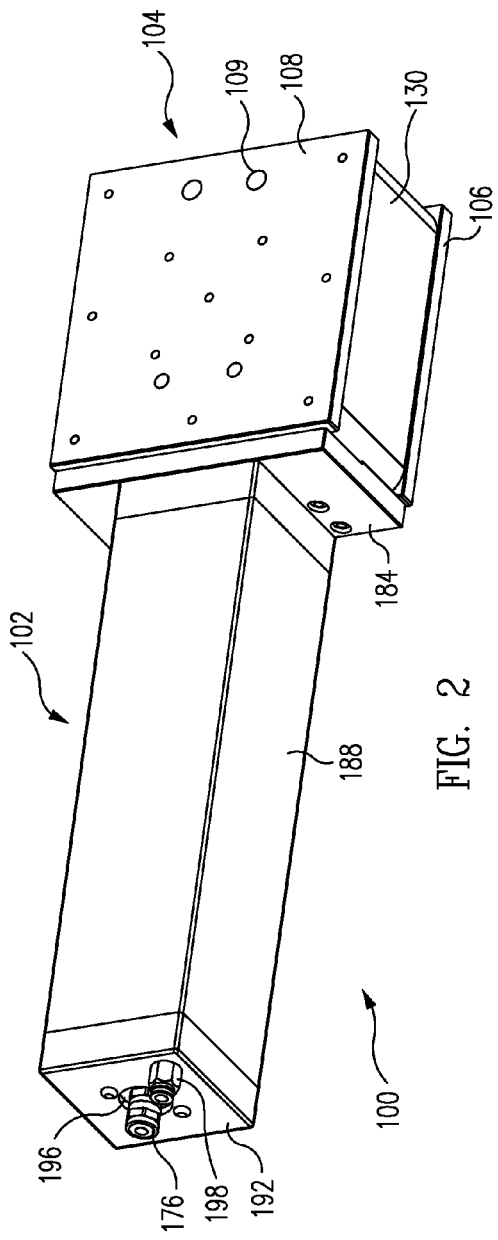
FIG. 2 is an upper front and side perspective view of the example leveling stage of FIG. 1.
Figure 10:
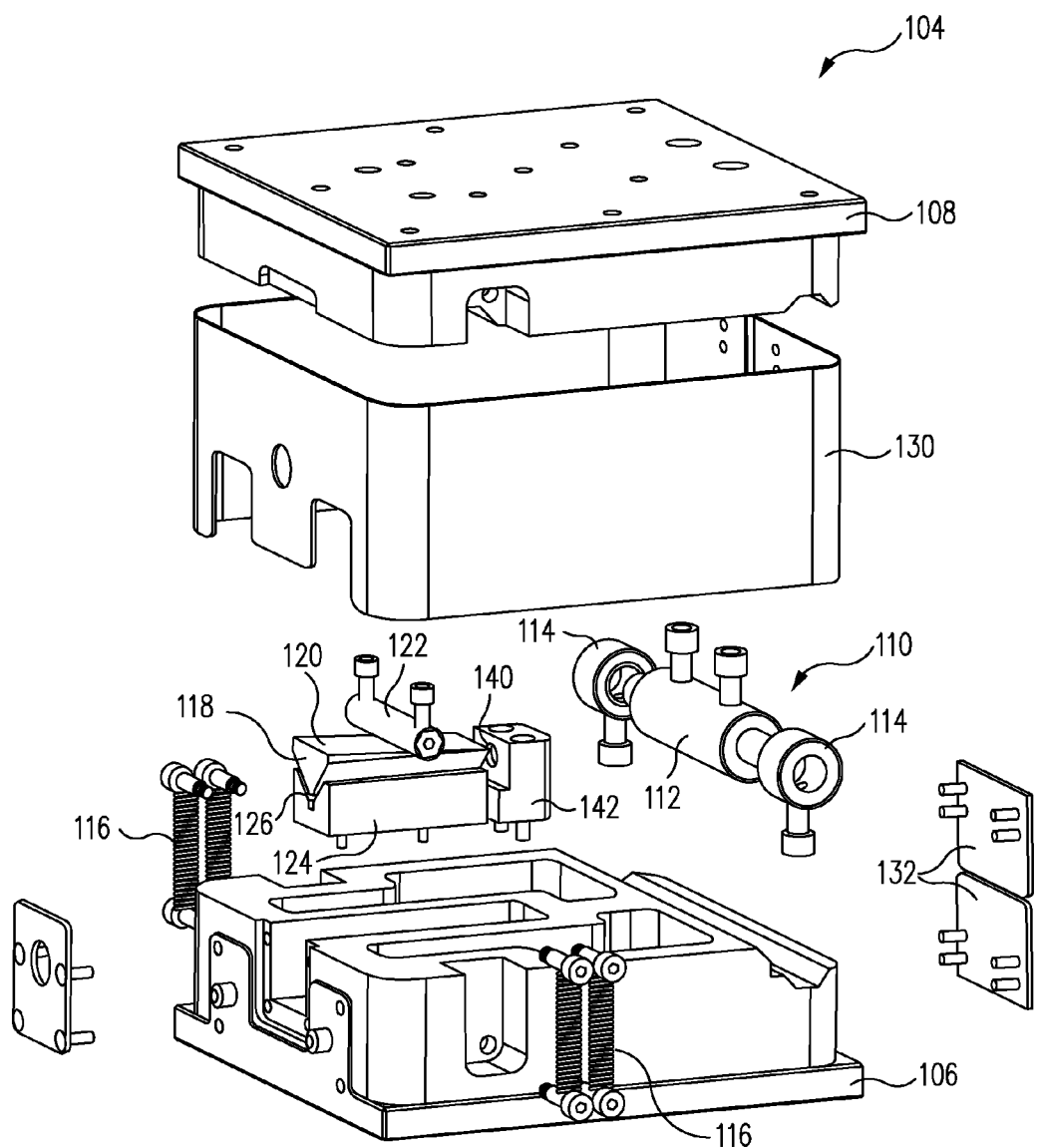
FIG. 10 is an exploded upper side perspective view of the stage portion of the leveling stage of FIG. 1.

FIG. 9 is a cross-sectional view of the leveling stage 100, and FIG. 10 is an exploded upper side perspective view of the stage 104 thereof. With reference to FIGS. 9 and 10, the stage 104 comprises lower stage 106, upper stage 108, and an elongated hinge 110 that couples corresponding edges of the upper and lower stages 108 and 106 together for pivotal movement of the two stages 106, 108 relative to each other about the axis of the hinge 110. As illustrated in the figures, the upper surface of the upper stage 108 and the lower surface of the lower stage 106 may, but need not necessarily, be substantially planar, and may include mounting features, such as threaded apertures 109 and the like (e.g., as shown in FIG. 2), to enable, e.g., a work piece or a load cell to be mounted on them, or alternatively, to enable them to be mounted on, e.g., the bed of a milling machine.

In the particular embodiment illustrated in FIG. 10, the hinge 110 comprises a hinge pin 112 and a pair of complementary hinge bushings 114 that may be precision ground to eliminate any play in the angular movement of the upper stage 108 relative to the lower stage 106. As those of skill in the art will appreciate, other alternative types of hinge mechanisms can be also be used in the stage 104 to minimize play.

As illustrated in FIG. 10, two pairs of springs 116 (e.g., coil springs) are disposed on opposite sides of the stage 104 respectively corresponding to the two opposite ends of the hinge 110. Each of the springs 116 has opposite ends respectively connected to the upper and lower stages 108 and 106. The springs 116 are used to bias the upper and lower stages 108 and 106 toward each other pivotally about the axis of the hinge 110 when the two stages 108 and 106 have been spread apart by a slide 118 (e.g., a wedge-like slide mechanism) described in more detail below. In the particular embodiment illustrated in the figures, the springs 116 bias the two stages 108 and 106 together with a compressive force of about 30 lb$_f$, but the number, locations and spring rates of the springs 116 can of course be varied, depending on the particular application at hand.

Referring to FIGS. 9 and 10, slide 118 is disposed for sliding movement on an upper surface of the lower stage 106 in a direction perpendicular to the axis of the hinge 110. The slide 118 has an upper surface 120 defining an inclined plane that is disposed in sliding abutment with a lower surface of the upper stage 108 such that movement of the slide toward and away from the hinge 110 respectively raises and lowers the upper stage 108 relative to the lower stage 106 pivotally about the hinge 110.

In more detail, in the example embodiment of FIGS. 9 and 10, a roll pin 122 (e.g., an elongated cylindrical roll pin) is mounted on a lower surface of the upper stage 108 such that a long axis of the roll pin 122 is disposed generally parallel to the hinge 110 axis and at least a portion of the roll pin 122 extends below the lower surface of the upper stage 108. A slide bearing 124 is mounted on an upper surface of the lower stage 106 and contains a V-shaped groove 126 that extends transversely to the respective long axes of the roll pin 122 and the hinge 110. The lower surface of the slide 118 comprises a V-shaped feature corresponding to the V-shaped groove 126 in the slide bearing 124, which is slidably disposed in the groove 126 and supported therein for low-friction sliding movement by a plurality of needle bearings 128. An inclined plane defined by the upper surface 120 of the slide 118 is disposed in sliding abutment with a lower surface of the roll pin 122. The foregoing arrangement results in a relatively "stiff" leveling stage 100, which for example can support loads greater than 1,000 lb$_f$.

In operation, when the slide 118 is urged toward the hinge 110, the inclined plane of the upper surface 120 of the slide 118 pushes against the roll pin 122, causing the upper stage 108 to rotate upward about the hinge 110 relative to the lower stage 106. The amount of the rotation of the upper stage 108 is controlled by, among other things, the slope, i.e., the rise/run, of the inclined plane of the upper surface 120. For example, in one embodiment, the slope of the inclined plane of the upper surface 120 may be about 1:15, i.e., for every 15 units of movement of the slide 118 toward or away from the hinge 110, the upper stage 108 is respectively raised or lowered by 1 unit relative to the lower stage 106. As discussed in more detail below, this configuration can produce a total angular range of relative movement of the upper stage 108 of about 0.14 degrees, with an achievable resolution of about 0.0354 arc-seconds.

As discussed above, it is desirable to provide a leveling stage 100 that can be utilized in work environments in which hazardous elements may be present, and it is therefore desirable to seal the interior of the stage 104 against the entry of such hazardous elements. As illustrated in FIG. 10, such a seal 130 may comprise, for example, an elastic barrier membrane that extends around a lateral periphery of the stage 104, and which is arranged to seal off the interior of the stage 104 from the ambient while permitting pivotal movement of the upper stage 108 relative to the lower stage 106.

The seal 130 may comprise, for example, ethylene propylene diene M-class (EPDM) rubber, that is laser-cut from a thin sheet of the material and then wrapped around the lateral periphery of the stage 104 and bonded to the side walls of both the upper and lower stages 108, 106 with an elastic adhesive, such as a polyurethane resin based adhesive. As illustrated in, e.g., FIGS. 6 and 7, which respectively show the stage 104 with and without the seal 130 in place, structural features, such as the springs 116 (e.g., stage biasing springs) and the hinge 110, can be recessed below the sidewall surfaces of the stages 106 and 108 so as to clear the seal 130. Also as shown in, e.g., FIG. 10, upper and lower seal plates 132 can be installed over the seal 130 to reinforce it at the hinge line of the stage 104.

The controlled movement of the upper stage 108 relative to the lower stage 106 is effected by means of the stage drive 102 (e.g., elongated motorized stage drive) portion of the leveling stage 100. As illustrated in FIG. 9, the stage drive 102 includes an elongated drive pin 134 that extends through an opening in a side of the stage 104. The drive pin 134 has a long axis disposed generally perpendicular to the long axis of the hinge 110 of the stage 104, a first end 136 disposed in abutment with a first side of the slide 118, and an opposite second end 138. As described in more detail below, a mechanism for urging the drive pin 134 in the axial direction is coupled to the second end 138 of the drive pin 134 and is operable to controllably urge the drive pin 134 against the slide 118 in an axial direction and toward the hinge 110 of the stage 104 so as to spread the two stages 108 and 106 apart, as described above. As illustrated in FIGS. 9 and 10, a second return spring 140 is mounted in a spring block 142 that is mounted internally to the stage 104 and is disposed coaxially with the drive pin 134 on a second side of the slide 118 opposite to the first side thereof. The spring 140 is arranged to urge the slide 118 against the drive pin 134 in an axial direction and away from the hinge 110.

As illustrated in FIGS. 2-9, the mechanism used to urge the drive pin 134 against the slide 118 in the axial direction comprises a motor bracket 144 (e.g., an elongated motor bracket) that is disposed coaxially with the drive pin 134. The motor bracket 144 has a first end 146 coupled to a first side of the stage 104 and an opposite second end 148. As shown in FIG. 9, a screw carriage 150 is disposed for axial sliding movement within the motor bracket 144. The screw carriage 150 has a first end 152 coupled to the second end 138 of the drive pin 134 and an opposite second end 154. An internally threaded collet 156 is mounted coaxially in the second end of the screw carriage 150. A threaded drive screw 158 is coaxially supported within the motor bracket 144 for rotation about the drive axis.

The drive screw 158 has a first end 160 disposed in threaded engagement with the internally threaded collet 156 and an opposite second end 162. A coaxially disposed flexible coupling 164 has a first end coupled to the second end 162 of the drive screw 158 and an opposite second end. A gear reduction unit 166 is mounted coaxially at the second end 148 of the motor bracket 144. The gear reduction unit 166 has an output shaft 168 coupled to the second end of the flexible coupling 164 and an input shaft 170 disposed at an opposite second end thereof. Motor 172 (e.g., an electrical stepper motor) is mounted coaxially at the second end of the gear reduction unit 166, and includes a first end with an output shaft 174 coupled to the input shaft 170 of the gear reduction unit 166, and an opposite second end having an electrical input connector 176 disposed thereon.

In operation, electrical power is supplied to the motor 172 by the control unit 52, causing the output shaft 174 of the motor 172 to rotate through a selected number of angular "steps." The angular motion of the motor output shaft 174 is then either multiplied or reduced by the gear reduction unit 166, depending on its gearing ratio, and then input through the flexible coupling 164 to the drive screw 158. Rotational movement of the drive screw 158 in the collet 156 is translated into axial movement of the screw carriage 150, drive pin 134 and abutting slide 118.

In the particular embodiment of FIG. 9, a middle portion of the drive screw 158 is supported for rotation by a pair of coaxial angular bearings 159 mounted on opposite sides of a transverse interior wall 145 of the motor bracket 144. Additionally, the drive pin 134 may be threaded, and a pair of threaded locking nuts 135 may be used to clamp a portion of the second end 138 of the drive pin 134 to the first end 152 of the screw carriage 150 at a selected axial position relative thereto. This arrangement enables the "stroke," i.e., the axial travel, of the drive pin 134 to be adjusted within a desired range. Further, the flexible coupling 164 may comprise a slip clutch that absorbs sudden shocks that can be imparted to the "drive train" of stage drive 102 when the motor 172 starts and stops. Thus, for example, if the stage 104 hits a "hard stop" during its movement, the slip clutch of the flexible coupling 164 will slip and the components down-stream of the flexible coupling 164 will not be damaged.

As those of skill in the art will appreciate, the motor 172, acting in conjunction with the gear reduction unit 166, can apply a substantial amount of torque, and hence, axial force, to the drive screw 158, screw carriage 150 and drive pin 134 during operation. Accordingly, as discussed above, it is desirable to establish minimum and maximum allowable limits of travel of these elements of the drive train, and hence, angular movement of the upper stage 108 relative to the lower stage 106, to prevent them from being damaged. In this regard, a pair of dowel pins 178 may be disposed in the floor of the motor bracket 144 at the opposite ends of the screw carriage 150 to act as limit stops to its axial travel. Thus, when the screw carriage 150 encounters one of these hard stops, the slip clutch of the flexible coupling 164 will slip to prevent damage to the drive train elements. However, to inhibit the likelihood of such an occurrence, an additional limit stop measure can be provided.

As illustrated in FIG. 8, this additional limit stop measure can be effected by the provision of first and second limit switches 180 and 182 respectively mounted in the motor bracket 144 at the opposite ends of the screw carriage 150. The limit switches 180 and 182 may be arranged such that movement of the screw carriage 150 to an axial position corresponding to a minimum allowable position of the upper stage 108 relative to the lower stage 106 trips the first switch 180 and thereby disconnects electrical power to the motor 172. Similarly, movement of the screw carriage 150 to a position corresponding to a maximum allowable position of the upper stage 108 relative to the lower stage 106 trips the second switch 182 and thereby disconnects electrical power to the motor 172.

As described above, the tripping of either limit switch 180 and 182 can be arranged to cause a corresponding indicator light 68A or 68B on the control unit 52 to illuminate, and additionally, can cause another indicator light 66A to illuminate to indicate that electrical power has been automatically disconnected from the motor 172, in which case electrical power to the motor 172 can be temporarily restored by depressing the momentary contact switch 64 on the front panel of the control unit 52.

Figure 3:
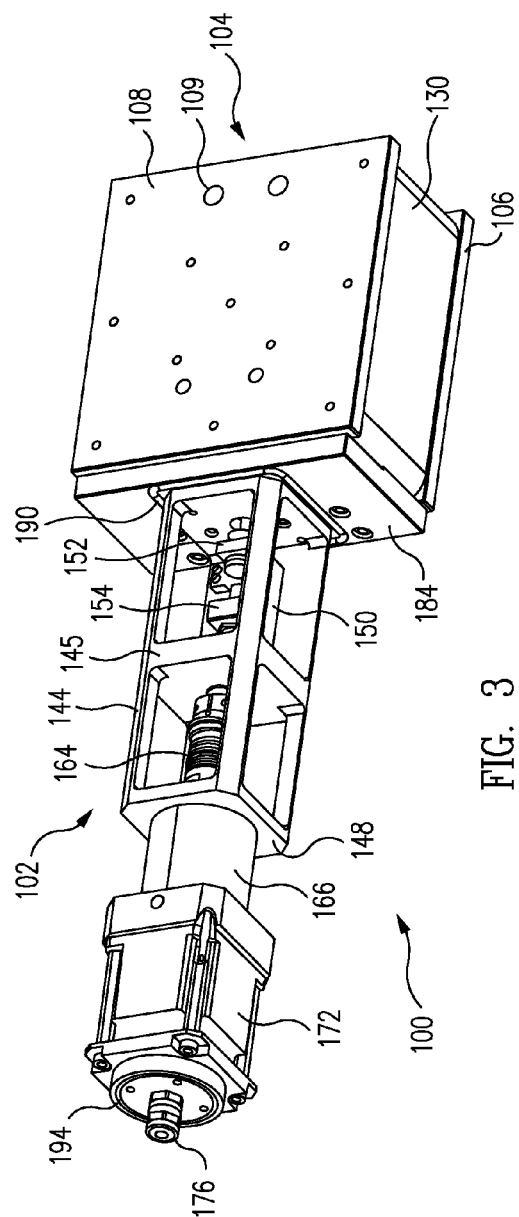
FIG. 3 is another upper front and side perspective view of the example leveling stage of FIG. 2, in which a protective cover on a motorized stage drive portion of the leveling stage is removed to reveal the underlying structure thereof.
Figure 4:
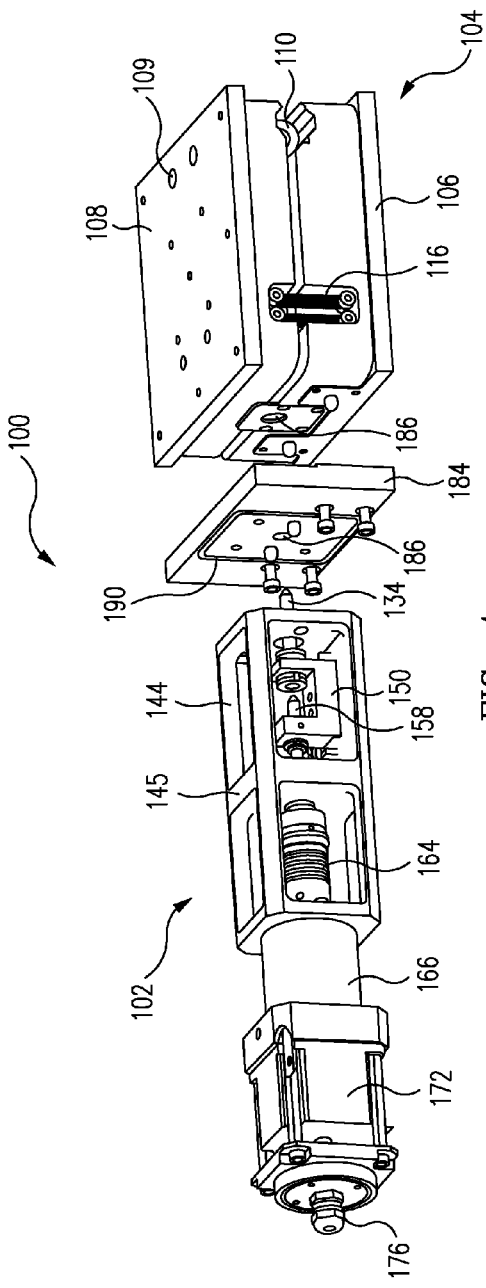
FIG. 4 is an exploded upper front and side perspective view of the leveling stage of FIG. 1.
Figure 5:
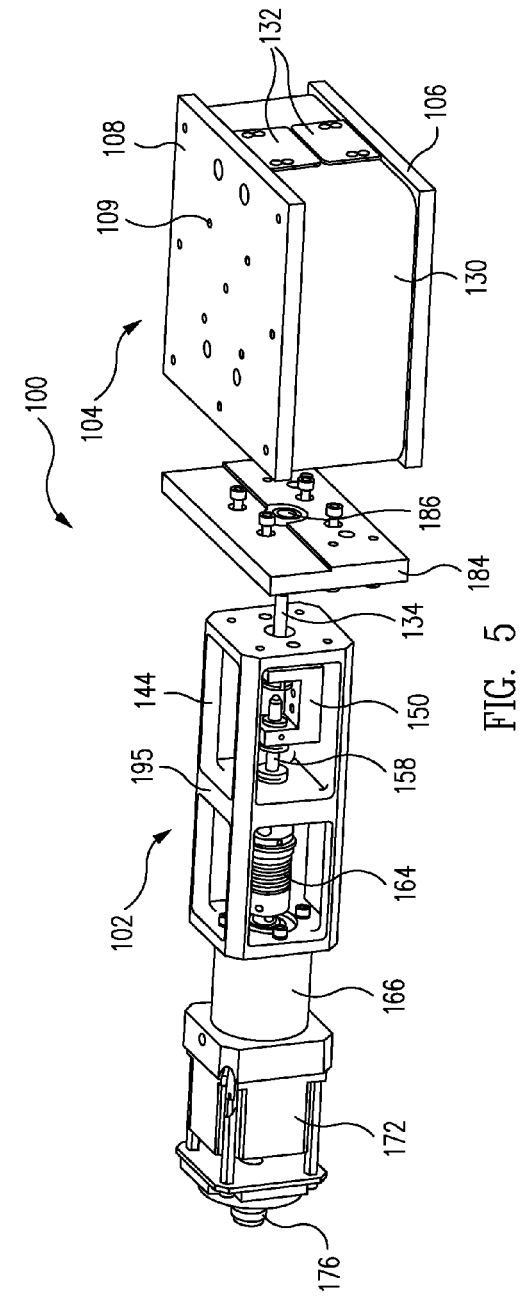
FIG. 5 is an exploded upper rear and side perspective view of the leveling stage of FIG. 1.

As illustrated in FIGS. 1-9, the first end 146 of the motor bracket 144 is sealingly coupled to the stage 104 by means of an adapter plate 184 that is mounted against the seal 130 at a side of the stage 104 opposite the hinge 110. Both the adapter plate 184 and the seal 130 have concentric central openings 186 through which the first end 136 of the drive pin 134 extends into the stage 104 and into abutments with the slide 118. As illustrated in, e.g., FIGS. 2 and 3, a conforming cover 188 is disposed over the motor 172, gear reduction unit 166 and the drive elements disposed within the motor bracket 144 to protect the elements of the stage drive 102 against any hazardous fluids or vapors in the working environment. As illustrated in FIGS. 2 and 3, the cover 188 has an open first end in sealing abutment with a corresponding seal, e.g., an O-ring 190, in the adapter plate 184, a closed, opposite second end 192 having an interior surface in sealing abutment with another sealing feature, e.g., an O-ring 194 disposed at the second or outboard end of the motor 172, and an opening 196 in the second end 192 through which the electrical input connector 176 of the motor 172 protrudes.

Although the sealing features of the cover 188 and seal 130 are arranged to provide good overall protection to the interior of the entire leveling stage 100 from the entry of any hazardous fluids in the working environment, it is also possible as a second level of protection to pressurize the internal volume of the leveling stage 100 with a dry gas, such as dry nitrogen ($N_2$), to prevent the entrance of any fluids into the leveling stage 100. This can be effected by the provision of conduits, such as a pressure fitting 198 (FIG. 2) disposed on the second end 192 of the cover 188, and the concentric openings 186 in the adapter plate 184 and the membrane seal 130, that enable the introduction of the pressurized gas into the interior volume of the cover 188, and thence, into the stage 104. Thus, even if a small leak is present in the cover 188 and/or seal 130, the presence of the dry gas at a pressure greater than that of the surrounding ambient will prevent any leakage of fluids into the interior of the leveling stage 100.

As those of skill in the art will appreciate, many variations and substitutions are possible in the components of and their arrangement in the novel leveling stage 100 to effect different angular positions and setting resolutions of the upper stage 108 relative to the lower stage 106. Thus, for example, in only one of many possible example embodiments, the motor 172 may comprise a Parker Stepper Motor, model LV231-01-FL, capable of effecting 200 steps per revolution, i.e., with a resolution of about 1.8 degrees per step. However, by making a simple change in the configuration of the motor drive software, the resolution can be increased to as much as 25,000 steps per revolution.

Similarly, the gear reduction unit 166 may comprise, for example, an Alpha model number 1P 050-M01-5-111-000, with a reduction ratio of, e.g., 1:5, which would change the output resolution of the output shaft 168 from 20 to 1000 steps per revolution without a change in the motor software. As another example, the drive screw 158 may comprise a Newport model AJS100-1H Custom screw having, for example, a pitch of 100 threads-per-inch (TPI). Because the screw carriage 150 transforms the rotary motion of the drive screw 158 into linear motion of the screw carriage 150, this results in a movement of the screw carriage 150 of about 0.01 inches per revolution of the drive screw 158. Thus in one possible example embodiment in which the motor is set to $\frac{1}{200}$ revolution (1.8 degrees) per step, and assuming the example slide 118 discussed above with an upper surface 120 having a slope of 1:15, the linear travel of the screw carriage 150, and hence, the drive pin 134 and slide 118, is $$\frac{1 \text{ Step}}{1} \times \frac{360 \text{ Degrees}}{200 \text{ Step}} \times \frac{1 \text{ rev}}{5 \text{ rev}} \times \frac{.01 \text{ Inch}}{360 \text{ deg}} \times \frac{1 \text{ length}}{15 \text{ length}} = 0.000,$$

000, 670 inch.

Thus,
1 Step=0.000,000,670 Inch=17.018 nm=0.17 micron travel of the slide 118.

If the angle between the upper stage 108 and the lower stage 108 is defined as θ, and for very small angle values, θ≈tan θ, then $$\theta = \tan\Theta = \frac{0}{a}$$
$$= \frac{0.000, 000, 670 \text{ in}}{3.905 \text{ in}}$$
$$= 0.000, 009, 83 \text{ degrees}$$
$$= 0.000, 000, 1715659 \text{ radians}$$
$$= 0.035, 388 \text{ arc seconds.}$$

Obviously, other angular resolutions and ranges of the leveling stage 100 can be easily obtained by adjusting the various stage drive component parameters discussed above.

FIGS. 11-14 illustrate an alternative embodiment of a leveling stage 204 which is capable of adjusting the angular position of a work piece relative to a reference surface in two orthogonal axes, and hence, is referred to herein as a "dual axis" leveling stage 204. In the figures, in which the seals 130 and respective motorized drive mechanisms (e.g., stage drive 102) of the leveling stage 204 are omitted for clarity, the remaining elements of the dual axis leveling stage 204 that are similar to the "single axis" leveling stage 100 of FIGS. 1-10 are numbered the same as or similarly to those of the latter. Thus, with reference to FIGS. 11-14, the dual axis leveling stage 204 comprises first and second (single axis) stages 104A and 104B, in which the second stage 104B is disposed on top of the first stage 104A, with the respective hinges 110 of the two stages 104A and 104B being disposed orthogonal to each other, and wherein the upper stage 108 of the first or lower stage 104A is formed integrally with the lower stage 106 of the second or upper stage 104B to define a single "intermediate" stage 107.

Figure 12:
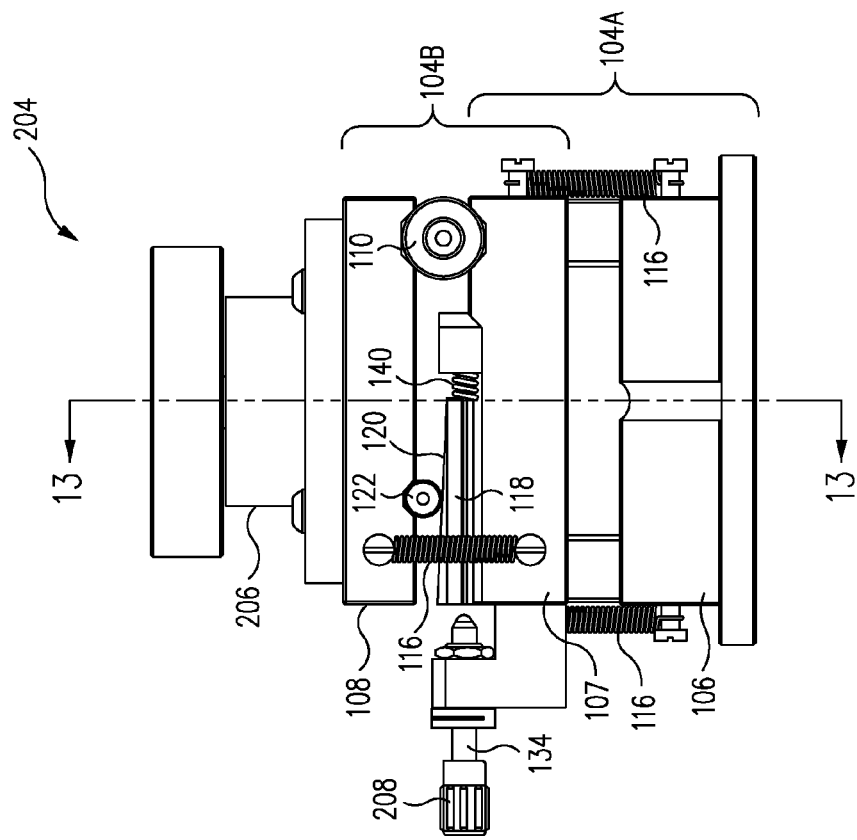
FIG. 12 is a side elevation view of the dual axis leveling stage of FIG. 11.
Figure 11:
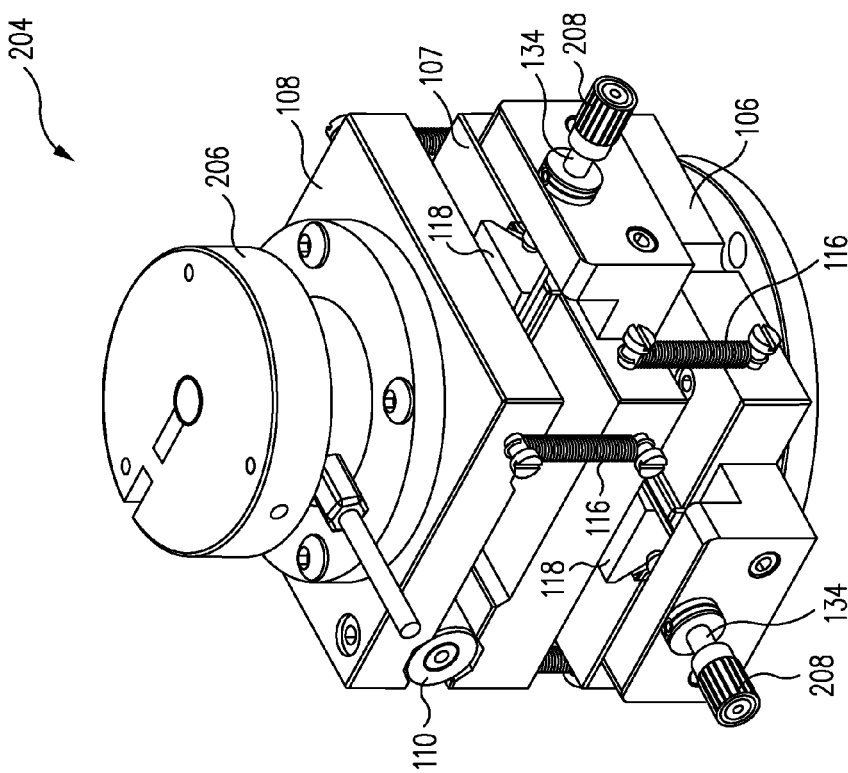
FIG. 11 is an upper side perspective view of a dual axis leveling stage in accordance with an embodiment of the invention.
Figure 15:
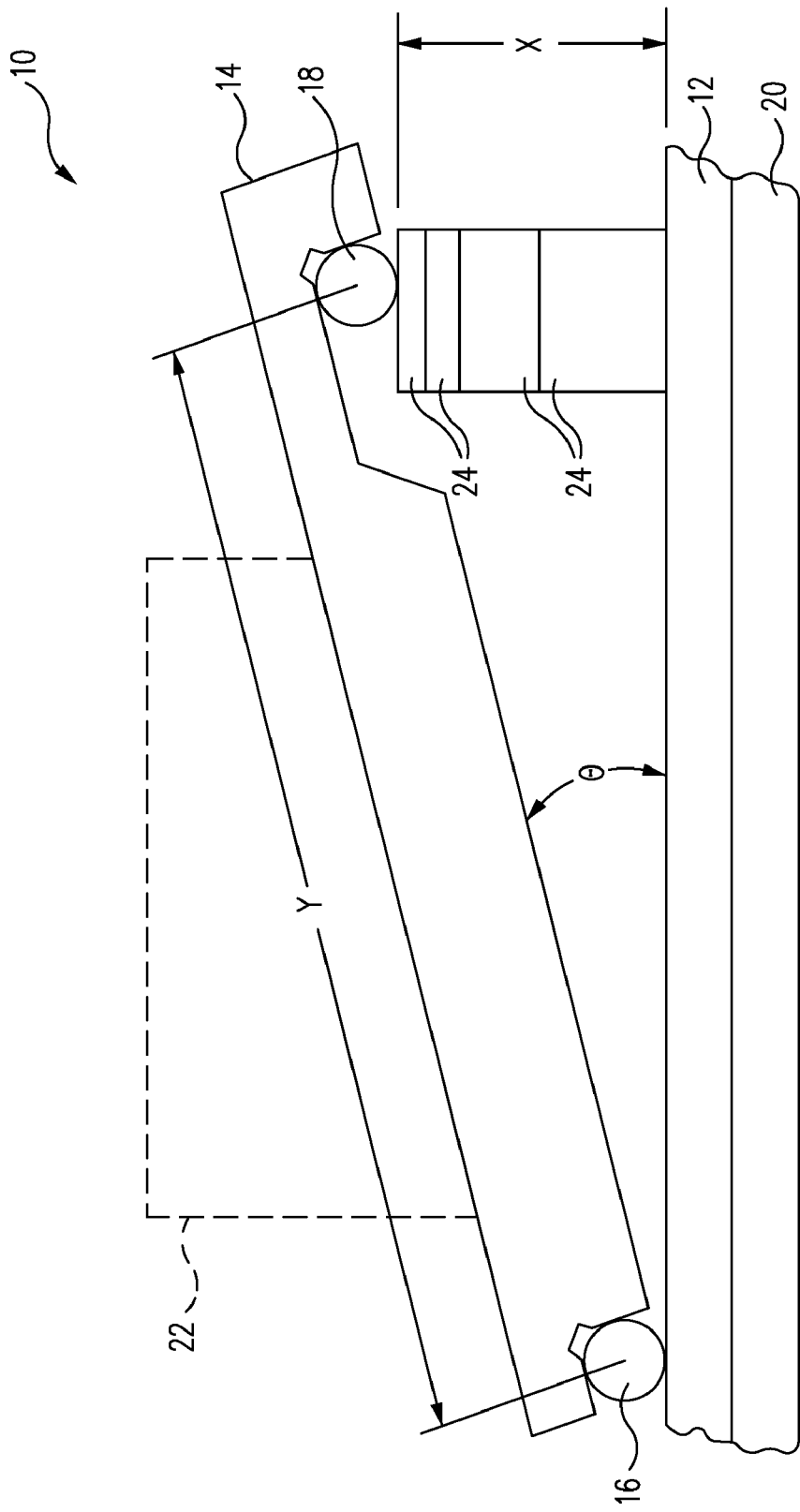
FIG. 15 is a schematic elevation view of a conventional sine plate apparatus.

The two (single axis) stages 104A and 104B may be driven by hand, e.g., by turning the respective actuation knobs 208 on the ends of the drive pins 134, or alternatively, by a pair of motorized stage drives (omitted in the figures for clarity) that are similar to the stage drive 102 described above, and which are respectively operable to controllably move the respective slides 118 of the first and second stages 104A and 104B relative to two orthogonal axes. Also, as illustrated in FIGS. 11-12, a load cell 206 can be disposed on the upper stage 108 of the second stage 104B for measuring loads imposed by, for example, a work piece (not illustrated) mounted on the dual axis leveling stage 204.

While the invention has been described in detail in connection with only a limited number of embodiments, it should be understood that the invention is not limited to such disclosed embodiments. Rather, as discussed above, the invention can be modified to incorporate any number of variations, alterations, substitutions or equivalent arrangements not heretofore described, but which are commensurate with the spirit and scope of the invention. Additionally, while various embodiments of the invention have been described, it should be understood that aspects of the invention may include only some of the described embodiments. Accordingly, the invention should not be seen as limited by the foregoing description, but is only limited by the scope of the appended claims and their functional equivalents.

What is claimed is:

1. A leveling stage, comprising:
    a stage, including:
        an upper stage;
        a lower stage;
        a hinge coupling corresponding edges of the upper and lower stages together for pivotal movement of the two stages relative to each other about a pivot axis of the hinge;
        a first spring pivotally biasing the upper and lower stages toward each other about the pivot axis;
        a slide disposed for sliding movement on an upper surface of the lower stage in a direction perpendicular to the pivot axis, the slide having an upper surface defining an inclined plane disposed in sliding abutment with a lower surface of the upper stage such that movement of the slide toward and away from the hinge respectively raises and lowers the upper stage relative to the lower stage; and,
    a stage drive coupled to the stage and operable to controllably move the slide relative to the hinge.

2. The leveling stage of claim 1, comprising;
    an elongated cylindrical roll pin mounted on a lower surface of the upper stage such that a long axis of the roll pin is disposed generally parallel to the pivot axis and at least a portion of the roll pin extends below the lower surface of the upper stage; and,
    a slide bearing mounted on an upper surface of the lower stage and containing a V-shaped groove extending generally transversely to the long axis of the roll pin, wherein
    a lower surface of the slide comprises a V-shaped feature slidably disposed in the V-shaped groove of the slide bearing, and
    the inclined plane of the upper surface of the slide is disposed in sliding abutment with a lower surface of the roll pin.

3. The leveling stage of claim 2, comprising a plurality of needle bearings disposed between the V-shaped feature of the slide and the V-shaped groove of the slide bearing.

4. The leveling stage of claim 1, comprising a seal extending around a lateral periphery of the stage and arranged to seal the interior of the stage from the ambient while allowing pivotal movement of the upper stage relative to the lower stage.

5. The leveling stage of claim 4, wherein the seal comprises an elastic membrane wrapped around the lateral periphery of the stage and bonded to side walls of the upper and lower stages.

6. The leveling stage of claim 5, wherein the elastic membrane comprises ethylene propylene diene M-class (EPDM) rubber.

7. The leveling stage of claim 1, wherein at least one of an upper surface of the upper stage and a lower surface of the lower stage is substantially planar.

8. The leveling stage of claim 1, wherein the drive assembly comprises:
    an elongated drive pin extending into a side of the stage and having a long axis disposed generally perpendicular to the pivot axis, a first end disposed in abutment with a first side of the slide, and an opposite second end;
    a drive pin drive mechanism coupled to the second end of the drive pin and operable to controllably urge the drive pin against the slide in an axial direction and toward the hinge; and,
    a second spring disposed coaxially with the drive pin on a second side of the slide opposite to the first side thereof and arranged to urge the slide against the drive pin in an axial direction and away from the hinge.

9. The leveling stage of claim 8, wherein the drive pin drive mechanism comprises:
    an elongated motor bracket disposed coaxially with the drive pin, the bracket having a first end coupled to a first side of the stage and an opposite second end;
    a screw carriage disposed for axial sliding movement within the motor bracket, the screw carriage having a first end coupled to the second end of the drive pin and an opposite second end;
    a threaded collet mounted coaxially in the second end of the screw carriage;
    a threaded drive screw coaxially supported within the motor bracket for rotation, the drive screw having a first end in threaded engagement with the collet and an opposite second end;
    a coaxially disposed flexible coupling having a first end coupled to the second end of the drive screw and an opposite second end;

a gear reduction unit mounted coaxially at the second end of the motor bracket, the gear reduction unit having an output shaft coupled to the second end of the flexible coupling and an opposite end with an input shaft; and, an electrical stepper motor mounted coaxially at the second end of the gear reduction unit, the motor having a first end with an output shaft coupled to the input shaft of the gear reduction unit and an opposite second end having an electrical input connector disposed thereon.

10. The leveling stage of claim 9, wherein the drive pin is threaded, and further comprising a pair of threaded nuts clamping a second end portion of the drive pin to the first end of the screw carriage at a selected axial position relative thereto.

11. The leveling stage of claim 9, wherein the flexible coupling comprises a slip clutch.

12. The leveling stage of claim 9, comprising first and second limit switches respectively mounted in the motor bracket at the opposite ends of the screw carriage and arranged such that:

movement of the carriage to a position corresponding to a minimum allowable position of the upper stage relative to the lower stage trips the first switch and thereby disconnects electrical power to the stepper motor; and, movement of the carriage to a position corresponding to a maximum allowable position of the upper stage relative to the lower stage trips the second switch and thereby disconnects electrical power to the stepper motor.

13. The leveling stage of claim 9, wherein a middle portion of the drive screw is supported for rotation by a pair of coaxial angular bearings mounted in an interior wall of the motor bracket.

14. The leveling stage of claim 9, comprising:

a seal extending around a lateral periphery of the stage and arranged to seal the interior of the stage from the ambient while permitting pivotal movement of the upper stage relative to the lower stage;

an adapter plate mounted against the seal at the first side of the stage and sealingly coupling the first end of the motor bracket to the leveling stage, the adapter plate and seal having concentric central openings through which the first end of the drive pin extends into the stage; and, a cover disposed over the motor bracket, the cover having an open first end in sealing abutment with the adapter plate, a closed, opposite second end in sealing abutment with the second end of the motor and an opening in the second end through which the electrical connector of the stepper motor protrudes.

15. The leveling stage of claim 14, further comprising conduits arranged in the seal, the adapter plate and the cover so as to enable the introduction of a pressurized gas into the interior of the cover and the leveling stage.

16. The leveling stage of claim 9 further comprising a stepper motor control unit operable to control rotational movement of the stepper motor.

17. A method for disposing a work piece at a selected angular position relative to a reference surface, the method comprising:

providing a leveling stage in accordance with claim 1 disposing a lower surface of the lower stage on the reference surface;

disposing the work piece on an upper surface of the upper stage; and, controllably moving the slide of the leveling stage relative to the hinge thereof with the drive assembly until the work piece is disposed at the selected angular position relative to the reference surface.

18. A dual axis leveling stage, comprising:

a first leveling stage configured in accordance with claim 1;

a second leveling stage configured in accordance with claim 1 disposed on top of the first leveling stage, the respective hinges of the first and second leveling stages being disposed orthogonal to each other; and, a pair of drive assemblies respectively operable to controllably move the respective slides of the first and second leveling stages relative to the respective hinges thereof.

19. The dual axis leveling stage of claim 18, wherein the upper stage of the first leveling stage is integral with the lower stage of the second leveling stage.

20. The dual axis leveling stage of claim 19, comprising a load cell disposed on an upper surface of the upper stage of the second leveling stage.

* * * * *